United States Patent
Hyun et al.

(10) Patent No.: US 9,697,945 B2
(45) Date of Patent: Jul. 4, 2017

(54) MAGNETIC FILM HAVING WIRELESS CHARGING RADIATOR CONDITION, METHOD OF MANUFACTURING THE SAME, AND WIRELESS CHARGING DEVICE USING THE SAME

(71) Applicant: LG INNOTEK CO., LTD., Seoul (KR)

(72) Inventors: Soon Young Hyun, Seoul (KR); Seok Bae, Seoul (KR); So Yeon Kim, Seoul (KR); Won Ha Moon, Seoul (KR); Nam Yang Lee, Seoul (KR); Hyung Eui Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 268 days.

(21) Appl. No.: 14/397,901

(22) PCT Filed: Apr. 30, 2013

(86) PCT No.: PCT/KR2013/003755
§ 371 (c)(1),
(2) Date: Oct. 30, 2014

(87) PCT Pub. No.: WO2013/165167
PCT Pub. Date: Nov. 7, 2013

(65) Prior Publication Data
US 2015/0123605 A1    May 7, 2015

(30) Foreign Application Priority Data
Apr. 30, 2012 (KR) .................. 10-2012-0045799

(51) Int. Cl.
*H01F 5/00*    (2006.01)
*H01F 27/28*    (2006.01)
(Continued)

(52) U.S. Cl.
CPC ........... *H01F 27/2804* (2013.01); *H01F 5/00* (2013.01); *H01F 27/24* (2013.01); *H01F 27/365* (2013.01);
(Continued)

(58) Field of Classification Search
CPC ..................... H01F 5/00; H01F 27/00–27/35
(Continued)

(56) References Cited

U.S. PATENT DOCUMENTS 8,692,639 B2 *  4/2014  Baarman ............. H01F 1/26
                                                  336/110
9,251,950 B2 *  2/2016  Hatanaka ............. H01F 38/14
(Continued)

FOREIGN PATENT DOCUMENTS

JP    2002-299138 A    10/2002
JP    3432317 B2    8/2003
(Continued)

OTHER PUBLICATIONS

International Search Report dated Aug. 13, 2013 issued in Application No. PCT/KR2013/003755.
(Continued)

*Primary Examiner* — Tuyen Nguyen
(74) *Attorney, Agent, or Firm* — KED & Associates, LLP

(57) ABSTRACT

Since the magnetic film of the present invention has a much thinner thickness compared to a corresponding conventional magnetic layer and radiator coil material assembly and has no adhesive layer or air layer between the magnetic layer and the radiator, permeability required at the time of charging can be improved, a loss rate can be reduced and high charging efficiency can be obtained, Furthermore, since a band width and a gain rate can be improved, the magnetic film can be very usefully applied to wireless charging products which pursue slimming in design.

8 Claims, 2 Drawing Sheets

(51) Int. Cl.
   *H01F 38/14*   (2006.01)
   *H02J 7/02*    (2016.01)
   *H01F 27/36*   (2006.01)
   *H01F 27/24*   (2006.01)
   *H02J 7/00*    (2006.01)
   *H02J 5/00*    (2016.01)
   *H01F 1/28*    (2006.01)
   *H01F 1/37*    (2006.01)

(52) U.S. Cl.
   CPC ............ *H01F 38/14* (2013.01); *H02J 7/0042* (2013.01); *H02J 7/025* (2013.01); *H01F 1/28* (2013.01); *H01F 1/37* (2013.01); *H02J 5/005* (2013.01)

(58) Field of Classification Search
   USPC ..................................... 336/65, 83, 200, 232
   See application file for complete search history.

(56) References Cited

U.S. PATENT DOCUMENTS

| | | |
|---|---|---|
| 2011/0050382 A1 | 3/2011 | Baarman et al. |
| 2011/0210696 A1 | 9/2011 | Inoue ............................ 320/108 |
| 2011/0234014 A1 | 9/2011 | Kato et al. |
| 2012/0074233 A1 | 3/2012 | Finn et al. |

FOREIGN PATENT DOCUMENTS

| | | |
|---|---|---|
| JP | 2005-006440 A | 1/2005 |
| JP | 2009-170488 A | 7/2009 |
| KR | 2010-0111409 A | 10/2010 |
| KR | 10-1079679 B1 | 11/2011 |

OTHER PUBLICATIONS

European Search Report dated Feb. 26, 2016 issued in Application No. 13784482.5.

* cited by examiner

MAGNETIC FILM HAVING WIRELESS CHARGING RADIATOR CONDITION, METHOD OF MANUFACTURING THE SAME, AND WIRELESS CHARGING DEVICE USING THE SAME

CROSS-REFERENCE TO RELATED PATENT APPLICATIONS

This application is a U.S National Stage Application under 35 U.S.C. §371 of PCT Application No. PCT/KR2013/003755, filed Apr. 30, 2013, which claims priority to Korean Patent Application No. 10-2012-0045799, filed Apr. 30, 2012, whose entire disclosures are incorporated herein by reference.

BACKGROUND OF THE INVENTION

Field of the Invention

The present invention relates to a magnetic film having a wireless charging radiator function, and a manufacturing method and use thereof.

Description of the Related Arts

In general, since arithmetic operation devices and portable information communication such as a cellular phone, personal digital assistants (PDA), a palm-top computer, an internet phone and the like use a charging battery as an energy source, a battery charger is necessarily required.

A desktop or portable charger which has been currently commercialized adopts a contact-type charging method for bringing a battery into contact electrically with a charger. The contact-type charger has various problems which should be solved.

For example, the problems such as a charge failure problem and a battery lifetime shortening problem caused by contact failure should be solved. A problem which is that when a charger or a communication device is exposed to moisture or dust, system performance is deteriorated, should be solved. Also, A problem which is that since the malfunction of a communication device is generated due to static electricity generated when a charging metal terminal exposed to the outside comes into contact with the user's clothing, the reliability of a product is reduced, should be solved.

To solve these problems, researches for adopting a wireless charging method for charging a battery using a magnetic combination without an electrical contact have been carried out.

In a current wireless charging technology, to satisfy the values of permeability and a loss rate resulting from corresponding frequency (i.e. Magnetic resonance type: 100 to 200 kHz, Magnetic induction type: 200 to 300 kHz, 6.78 Mhz), the thickness of a magnetic material, the thickness and winding number of a metal coil material and the like become main factors for a magnetic material part (i.e. a magnetic material/metal coil material assembly).

As exemplified in FIG. 1, a conventional wireless charging magnetic material part is formed in a structure in which a magnetic material layer composed of a ferrite sintered material, a ferrite composite, a sendust sintered material, a composite and the like, an adhesive layer formed on the magnetic material layer, and a metal coil material formed on the adhesive layer to perform a radiator function are laminated.

In such a conventional magnetic material part having the radiator function for wireless charging, the adhesive layer or an air layer located between the magnetic material layer and the metal coil material causes an obstacle in permeability improvement, an obstacle in loss rate reduction, and an obstacle in slimming design of a wireless charging device due to the lamination structure.

SUMMARY OF THE INVENTION

An aspect of the present invention provides a wireless charging magnetic material part which can improve permeability required at the time of charging and which can reduce a loss rate and obtain high charging efficiency (Q).

Another aspect of the present invention provides a wireless charging magnetic material part which enables a wireless charging device to be designed to be slim.

According to an aspect of the present invention, there is provided a magnetic film having a radiator function for wireless charging, including: a magnetic layer having a thin-film shape and composed of a magnetic layer composition containing a magnetic material power and a binder resin; and a thin-film coil for radiator use which is directly laminated on a surface of the magnetic layer without using an adhesive agent.

Preferably, according to the present invention, the magnetic film having the radiator function for wireless charging is characterized in that the magnetic material power is one element or an alloy of a combination of two or more elements selected from the group consisting of Fe, Ni, Co, Mn, Al, Zn, Cu, Ba, Ti, Sn, Sr, P, B, N, C, W, Cr, Bi, Li, Y and Cd, or ferrite power.

Preferably, according to the present invention, the magnetic film having the radiator function for wireless charging is characterized in that a particle size of the magnetic material power ranges from 3 mm to 50 μm.

Preferably, according to the present invention, the magnetic film having the radiator function for wireless charging is characterized in that the binder resin is one resin or a mixture of two or more resins selected from the group consisting of a polyvinyl alcohol-based resin, a silicon-based resin, an epoxy-based resin, an acrylate-based rein, an urethane-based resin, a polyamide-based resin, and a polyimide-based resin.

Preferably, according to the present invention, the magnetic film having the radiator function for wireless charging is characterized in that a mix proportion of the magnetic material power to the binder in the magnetic layer composition is 10 to 90~95 to 5 in a weight ratio.

Preferably, according to the present invention, the magnetic film having the radiator function for wireless charging is characterized in that the magnetic layer composition contains a general additive agent, which is generally mixed in the bind resin, in an amount of less than 2 wt. % with respect to a total weight of the composition Preferably, according to the present invention, the magnetic film having the radiator function for wireless charging is characterized in that the metal thin-film coil is composed of one element or an alloy of a combination of two or more elements selected from the group consisting of Ag, Au, Cu and Al.

Preferably, according to the present invention, the magnetic film having the radiator function for wireless charging is characterized in that a thickness of the metal thin-film coil ranges from 5 μm to 1 mm.

According to the present invention, the wireless charging magnetic film having a radiator function is characterized in that a pitch of the metal thin-film coil ranges from 5 to 500 μm.

According to another aspect of the present invention, there is provided a method of manufacturing the magnetic film having the radiator function for wireless charging, the method including: molding a magnetic layer having the thin-film shape with a magnetic layer composition containing magnetic material power and binder resin; and forming a thin-film coil directly on the magnetic layer.

In the method, the magnetic layer having the thin-film shape may be formed by forming a thin-film directly on a substrate and molding the thin film using a molding process.

In the method, the metal thin-film coil may be formed by plating and masking a metal directly on the magnetic layer, and thereafter etching it, silk-screening the metal directly on the magnetic layer, patterning and coating the metal directly on the magnetic layer; and sputtering the metal directly on the magnetic layer.

Also, according to the present invention, provided is a wireless charging device with the magnetic film having the radiator function for wireless charging.

According to the present invention, since the magnetic film 10 of the present invention correspond to the conventional magnetic layer and radiator coil material assembly has a much thinner thickness compared to the conventional assembly and has no adhesive layer or air layer between the magnetic layer and the radiator, permeability required at the time of charging can be improved, a loss rate can be reduced and high charging efficiency can be obtained, Furthermore, since a band width and a gain rate can be improved, the magnetic film can be very usefully applied to wireless charging products which pursue slimming in design.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE INVENTION

First, the present inventor has found the following matters through a research and has suggested the present invention. When a thin-film coil having a radiator function is directly laminated on a magnetic layer having a film shape and composed of a magnetic material power and a binder resin, an adhesive layer or an air layer was not present between the magnetic layer and the radiator. Therefore, permeability (p) required at the time of charging can be improved, a loss rate can be reduced, and high charging efficiency (Q) can be obtained. Furthermore, since a thickness can be largely reduced, it can be very usefully applied to a slimming design of wireless charging devices, and material and process costs can be reduced.

A magnetic film according to the present invention, which is intended to replace a conventional magnetic layer/metal coil assembly, is a magnetic film having a radiator function for wireless charging.

Hereinafter, the present invention will be specifically explained with reference to the accompanying drawings showing one exemplary embodiment of the present invention.

Figure 1:
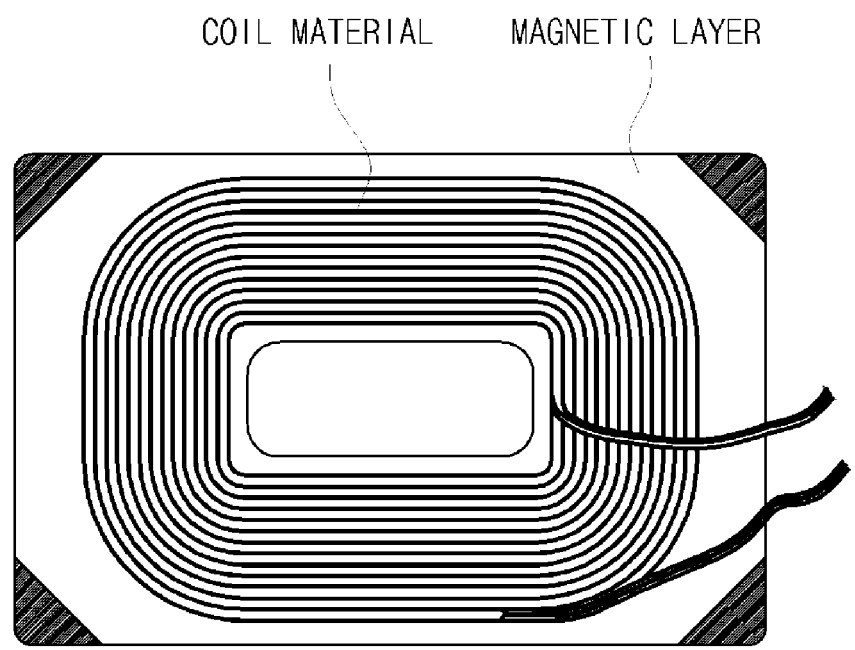
FIG. 1 is a photo showing a planar structure of a conventional magnetic layer/radiator coil assembly.
Figure 2:
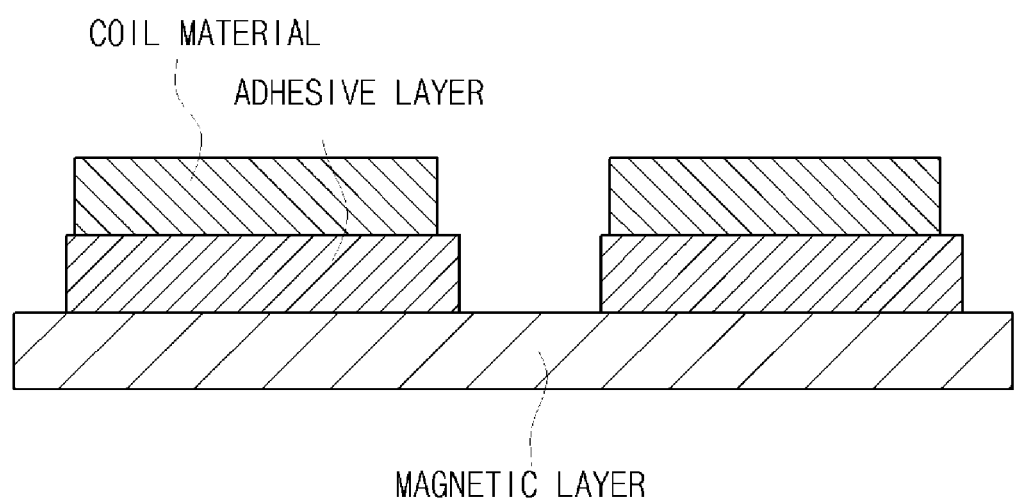
FIG. 2 is a cross-sectional view schematically showing a laminated structure of the assembly shown in FIG. 1.
Figure 3:
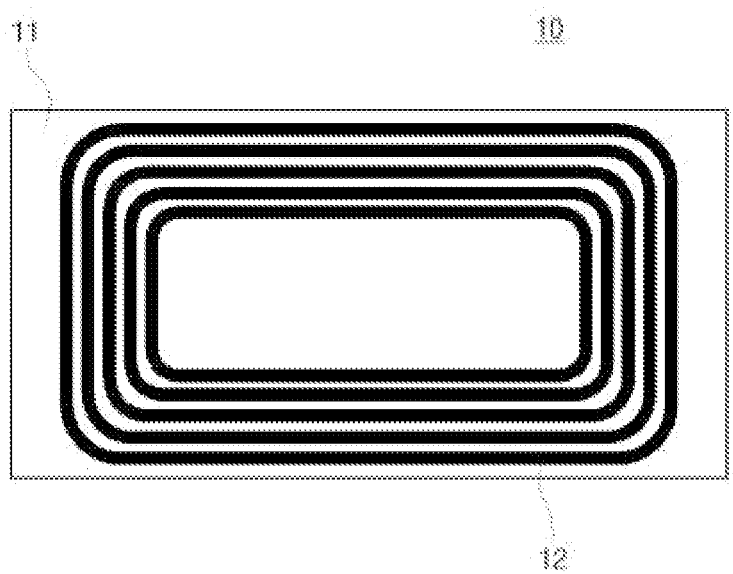
FIG. 3 is a plane view showing a magnetic film having a radiator function for wireless charging according to one exemplary embodiment.
Figure 4:
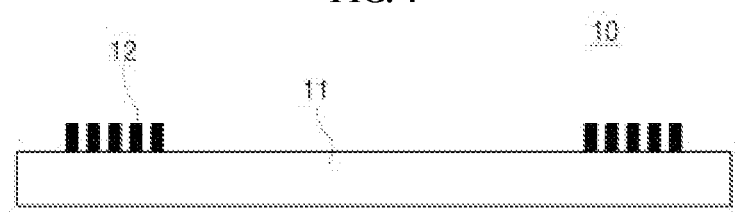
FIG. 4 is a cross-sectional view schematically showing a laminated structure of the magnetic film shown in FIG. 3.

As illustrated in FIG. 3 and FIG. 4, a magnetic film 10 of the present invention may include: a magnetic layer 11 having a thin-film shape; and a thin-film coil for radiator use 12 which is directly laminated on a surface of the magnetic layer without using an adhesive agent.

The magnetic film 10 of the present invention is configured such that the magnetic layer 11 having the thin-film shape is composed of a magnetic layer composition, and the magnetic composition contains a magnetic material power and a binder resin.

The example of the magnetic material power, which can be used in a magnetic layer composition, is one element or an alloy of a combination of two or more elements selected from the group consisting of Fe, Ni, Co, Mn, Al, Zn, Cu, Ba, Ti, Sn, Sr, P, B, N, C, W, Cr, Bi, Li, Y and Cd, or ferrite powder.

In the magnetic layer composition of the present invention, the binder resin may be uniformly mixed with the magnetic material power. If a binder has a property which enables thin-film molding of the magnetic material composition to be performed, the binder is not specifically limited. The examples of the binder resin are a polyvinyl alcohol-based resin, a silicon-based resin, an epoxy-based resin, an acrylate-based rein, an urethane-based resin, a polyamide-based resin, and a polyimide-based resin and the like. The resin may be used alone or in a mixture of two or more resins.

Preferably, a particle size of the magnetic material power ranges from 3 nm to 50 μm. If the particle size of the magnetic material power fails to meet the lowest limit of the range, it would be difficult to uniformly mix it with the resin, thereby causing non-uniform distribution of the magnetic material power on the magnetic layer. Furthermore, if the particle size exceeds the upper limit of the range, it would be difficult to make the magnetic layer thin. Thus, it is preferable that the particle size of the magnetic material power is selected within the range.

In the magnetic layer composition of the present invention, it is preferable that a mix proportion of the magnetic material power to the binder resin is 10 to 90~95 to 5 in a weight ratio. If the mix proportion of the magnetic material power in the magnetic layer composition is high, a physical property of the film is rather insufficient. If the mix proportion of the magnetic material power is too low, a wireless charging performance can be deteriorated. Thus, it is preferable that the magnetic material power and the binder resin are mixed in the proportion of the above range.

Also, a general additive agent, which is generally mixed in the bind resin, may be mixed in the magnetic layer composition of the present invention. In a case where this additive agent is mixed therein, it would be preferable that a content thereof is less than 2 wt. % with respect to a total weight of the composition. The examples of the additive agent are a silane coupling agent, an a defoaming agent, a cross-linking agent and the like.

In the magnetic film 10 of the present invention, the metal thin-film coil 12 laminated directly on the magnetic layer 11 having the thin-film shape performs a radiator function. The examples of the material metal are Ag, Au, Cu and Al and the like. The metal may be used alone or in an alloy of a combination of two or more elements.

Preferably, the metal thin-film coil 12 has a thickness of 5 μm to 1 mm, and a pitch of 5 to 500 μm. The metal thin-film coil 12 having this shape may be laminated and formed using a process of plating and masking the metal directly on the magnetic layer 11 having the thin-film shape, and thereafter etching it, a silk screening process, a pattern coating process, a sputtering process and the like.

Hereinafter, a manufacturing method of the magnetic film 10 having the radiator function for wireless charging according to the present invention will be explained based on preferred exemplary embodiments.

For example, the magnetic film 10 of the present invention may be manufactured by molding the magnetic material layer 11 having the thin-film shape with the magnetic layer composition containing the magnetic material powder and binder resin, and thereafter, forming the metal thin-film coil 12 directly on the magnetic layer 11.

The molding of the magnetic layer 11 having the thin-film shape may use a process of forming a thin film directly on a substrate, which has been well-known in the relevant field, a process of molding the thin film and the like.

As the example of the process of forming the thin film directly on the substrate, there is a process of forming the thin film by depositing the magnetic layer composition on the substrate using laser vapor deposition (LVD), physical vapor deposition (PVD), chemical vapor deposition (CVD) and the like.

The example of the thin-film molding process using molding is a thin-film molding process using injecting, pressing, casting and blow-molding of the magnetic layer composition.

In the formation of the metal thin-film coil 12, for example, a process of plaiting the magnetic layer 11 with the metal, masking it to a desired coil pattern, and etching it, a process of silk-screening the metal directly on the magnetic layer 11 to a desired coil pattern, a process of patterning and coating the metal directly on the magnetic layer 11 to a desired coil pattern, and a process of sputtering the metal directly on the magnetic layer 11 to a desired coil pattern may be used.

The magnetic film 10 having the radiator function for wireless charging may be applied to various wireless charging products. The magnetic film 10 of the present invention has a far more thin thickness compared to the conventional magnetic layer/radiator coil assembly. Furthermore, since there is no adhesive layer or air layer between the magnetic layer and the radiator, permeability required at the time of charging can be improved, a loss rate can be reduced, and high charging efficiency can be obtained. Furthermore, since a band width and a gain rate can be improved, the magnetic film 10 can be very usefully applied to wireless charging products which pursue a slimming design.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A magnetic film having a radiator function for wireless charging, the magnetic film comprising:
a magnetic layer having a thin-film shape and composed of a magnetic layer composition containing a magnetic material powder and a binder resin; and
a thin-film coil for radiator use which is directly laminated on a surface of the magnetic layer,
wherein the binder resin contains an additive agent, which is mixed in the binder resin, in an amount of less than 2% based on a total weight of the composition of the binder resin and the additive agent, and
wherein the additive agent is any one of a silane coupling agent, a defoaming agent or a cross-linking agent.

2. The magnetic film of claim 1, wherein the magnetic material powder is one element or an alloy of a combination of two or more elements selected from the group consisting of Fe, Ni, Co, Mn, Al, Zn, Cu, Ba, Ti, Sn, Sr, P, B, N, C, W, Cr, Bi, Li, Y and Cd, or ferrite powder.

3. The magnetic film of claim 1, wherein a particle size of the magnetic material powder is 3 nm to 50 μm.

4. The magnetic film of claim 1, wherein the binder resin is one resin or a mixture of two or more resins selected from the group consisting of a polyvinyl alcohol-based resin, a silicon-based resin, an epoxy-based resin, an acrylate-based rein, an urethane-based resin, a polyamide-based resin and a polyimide-based resin.

5. The magnetic film of claim 1, wherein a mix proportion of the magnetic material powder to the binder in the magnetic layer composition is 10 to 90~95 to 5 in a weight ratio.

6. The magnetic film of claim 1, wherein a thickness of the metal thin-film coil ranges from 5 μm to 1 mm.

7. The magnetic film of claim 1, wherein a pitch of the metal thin-film coil ranges from 5 to 500 μm.

8. A wireless charging device with the magnetic film having the radiator function as defined in claim 1.

* * * * *